Figure 3:
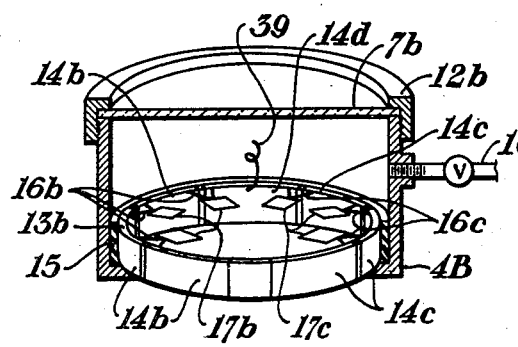

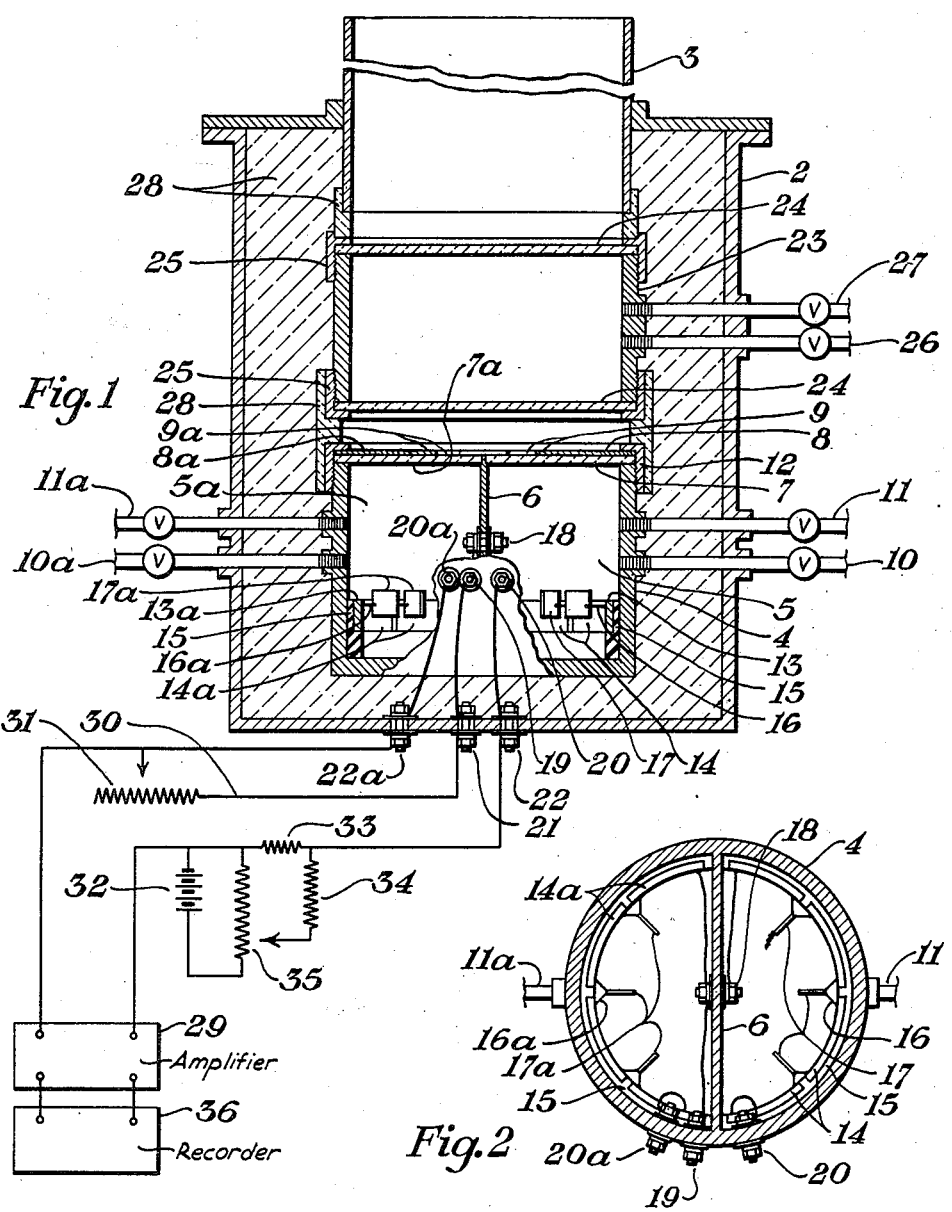

INVENTOR.
Norman Wright
BY
Griswold & Burdick
Attorneys

Patented Oct. 16, 1945

2,386,830

UNITED STATES PATENT OFFICE 2,386,830

METHOD AND APPARATUS FOR CONTINUOUS ANALYSIS AND CONTROL OF ORGANIC SYSTEMS

Norman Wright, Midland, Mich., assignor to The Dow Chemical Company, Midland, Mich., a corporation of Michigan Application September 2, 1942, Serial No. 457,109

14 Claims. (Cl. 202—40)

This invention concerns a method and apparatus for continuously analyzing an organic mixture during travel to, through, or from a system for handling the same and also for automatically controlling such system in accordance with the analysis of the mixture. The invention is particularly concerned with a method for continuously analyzing a mixture of butylene and butadiene during separation of these hydrocarbons by distillation in the presence of ammonia and for automatically controlling the distillation in accordance with the analysis to obtain optimum distilling efficiency, but it may be applied in analyzing continuously other solid, liquid, or gaseous organic mixtures and in controlling other systems for handling organic mixtures. For instance, it may be applied in controlling reaction systems wherein the mixtures to be analyzed are produced or consumed, or in controlling systems for mixing or blending the substances to be analyzed with one another or with other substances to form blended products; or it may be applied to systems wherein the organic mixture under consideration is to be separated into its components by extraction; etc. Although the kinds of systems to which the invention may be adapted vary widely, the invention is particularly concerned with systems in which the mixtures to be analyzed are in motion, e. g. in a state of flow.

The invention is restricted to the analysis or control of mixtures containing two or more organic compounds, at least one of which possesses a light absorption band distinctive from those of the other compounds present. It is known, of course, that heteratomic molecules, i. e. molecules containing more than one kind of element as distinguished from homoatomic molecules such as those of nitrogen or oxygen, have the property at room temperature or thereabout of absorbing light, particularly infrared light, of only certain wave lengths to produce spectra having bands which characterize the substance under treatment. A single heteratomic compound may possess a number of such light absorption bands, in which case the bands usually differ in strength or intensity. The stronger light absorption bands of a given compound are those resulting from the absorption of the greater amounts of light energy, and the weaker or less intense absorption bands are those resulting from the absorption of lesser amounts of light energy. For the purpose of this invention, a light absorption band of one component of a mixture is considered distinctive if it is either different in wave length from the light absorption bands of the other components of the mixture or if it is considerably stronger and more intense than a corresponding light absorption band of another component of the mixture. It is advantageous, for purpose of this invention, that the mixture to be analyzed contain two or more ingredients, each having a light absorption band distinctive from those of the other components, but this is not essential. It is sufficient that only one component of the mixture possess a distinctive light absorption band.

Various photo methods for analyzing a mixture of a single heteratomic substance and one or more homoatomic substances have heretofore been proposed. However, such known photo analytical methods are either not adapted, or are poorly adapted, to the direct analysis of organic mixtures, which, of course, contain a plurality of heteratomic compounds.

I have found that mixtures comprising two or more organic compounds, at least one of which possesses a distinctive light absorption band, may rapidly and accurately be analyzed in continuous manner by passing the same across a beam of infrared light and directing the transmitted light against each of two means for asborbing infrared light of certain wave lengths and for generating or varying an electric current uniformly in accordance with the temperature changes resulting from the absorption of the light, while having said two means connected together, with their electric potentials in opposition and with a galvanometer in the circuit. The readings of the galvanometer may be calibrated to indicate the proportion of one or more of the organic components of the mixture subjected to the analysis. Each of the means for absorbing light energy in such manner as to generate or vary an electric current or voltage comprises a substance for absorbing light of the desired wave length and, in thermal contact with said substance, a thermocouple or an equivalent device such as a thermopile or a bolometer for generating or varying an electric current uniformly with change in the temperature thereof. The light-absorptive substance may be gaseous, liquid or solid. When it is a solid or a viscous non-volatile liquid, the two "means" just mentioned may be housed either in a single cell (hereinafter referred to as a "detector cell") or in a separate detector cells. When the light absorptive substance is a gas or vapor, the two "means" are housed either in separate detector cells or in separate chambers of a single detector cell.

In order to obtain high sensitivity, and therefore accuracy in the analysis, it is necessary that the light absorptive substance included in one of said means (i. e. means for transforming light energy into an electric current or potential) have a light absorption band which corresponds closely in wave length to the distinctive light absorption band of the component of the mixture to be determined by the analysis and that it absorb relatively little light energy of other wave lengths. If the light absorbed were to consist largely of light of a variety of wave lengths, especially of light of wave lengths other than that absorbed by the component to be determined by the analysis (as has been the case in certain of the photo analytical methods heretofore known) then the change in electric current or voltage generated by the "means" is merely a measure of the total amount of light of all wave lengths absorbed by the sample to be analyzed and accurate analysis of a sample containing more than one heteratomic substance, i. e. analysis of an organic mixture, is not possible. The light absorptive substance included in the other of said "means" may have a light absorption band corresponding in wave length to a distinctive light absorption band of another component of the mixture to be analyzed or its stronger light absorption bands may not correspond to those of any of the components of the mixture to be analyzed.

Prior to use in analyzing an organic mixture, the apparatus is, of course, calibrated so that the readings of the galvanometer will indicate the proportion of one of the components of the mixture. The apparatus is calibrated by interposing mixtures, containing known proportions of the compound to be determined, between the source of infrared light and the detector cell or cells, and obtaining the reading of the galvanometer which corresponds to the proportion of said compound in each mixture. The values thus obtained may be plotted as a curve which will indicate the proportion of said compound in other mixtures thereafter placed across the beam of light. After calibrating the apparatus, the mixture to be analyzed may be passed in continuous flow across the beam of infrared light to obtain galvanometer readings which indicate the proportion of an organic component of the mixture at any instant, and which also quickly indicate any change in the proportion of said component in the mixture being passed across the beam of light.

Instead of depending upon readings of the galvanometer and interpreting such readings in terms of the composition of the mixture being analyzed, the electric current or electric potential from the detector cell or cells may be amplified and be transmitted to any of the usual devices for continuously recording the same, e. g. a device such as the Leeds and Northrup automatic recording potentiometer known as a "Micromax." The scale on the continuous recorder may of course be calibrated to indicate directly the composition of the mixture being analyzed.

The electric energy developed or transmitted by the detector cells may also be employed, preferably in amplified form, for controlling the temperature, pressure, rate of flow or other variable condition of a system for handling, e. g. producing, utilizing, or distilling, etc., the mixture which is being analyzed. Ways and means for employing a variable energy output of any system to adjust and control one or more other variables of the system are well known and are illustrated in U. S. Patent 2,118,842. Such known ways and means may be applied in conjunction with the method and apparatus herein disclosed to control the system for handling the mixture being analyzed in accordance with the composition of the latter so as to maintain uniform operation and results. Thus, in continuously mixing or blending two or more organic compounds, the invention may be applied so that any slight variation in the composition of the mixture produced will result in a prompt compensating change in the flow of one or more of the ingredients to the system so as to vary the proportions thereof toward that of the mixture which is desired. Similarly, the method may be applied in carrying out continuous distillations so as to vary the rate of feed, or the temperature, or pressure, or the amount of heat supplied to the still as necessary in order to obtain efficient fractionation.

It will be understood that the method of analysis herein disclosed permits a rapid, accurate and continuous determination of the ingredient or ingredients of an organic mixture which have a light absorption band distinctive from those of the other ingredients of the mixture and which corresponds in wave length to one of the absorption bands of the substance used in the detector cells. When the mixture to be analyzed contains only a single ingredient having said distinctive absorption band then it is the proportion of this single ingredient in the mixture which is determined, but when two or more of the ingredients of the mixture each possess this same light absorption band then it is the combined proportion of such ingredients in the mixture which is determined. Thus, the method may be applied in analyzing a mixture of butylene-1, butylene-2, isobutylene, and butadiene-1,3, either to determine directly the proportion of butadiene in the mixture or to determine the combined proportion of the butylenes in the mixture. However, since the stronger light absorption bands of butylene-1, of butylene-2, and of isobutylene are practically the same, the method may not be applied satisfactorily to determine the proportion of only one of these isomers.

A single heteratomic compound may, of course, possess two or more light absorption bands which usually differ in intensity. Whenever possible, the principal band of a compound is relied upon in carrying out an analysis by the present method. However, it sometimes happens, e. g. in the case of a mixture of normal butane and isobutane, that the principal absorption bands of the ingredients of a mixture are identical, but that one of the ingredients possesses a minor light absorption band which is distinctive. In such instance, it is, of course, the distinctive minor light absorption band that is relied upon in carrying out the analysis and one of the two means in the detector cell or cells for absorbing light energy and transforming it into an electric current or potential comprises a substance having said light absorption band, preferably as its principal absorption band.

Figure 4:
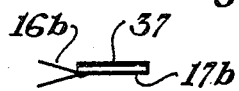
Figure 6:
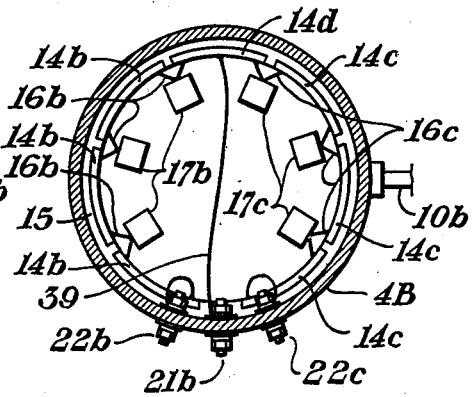
Figure 5:
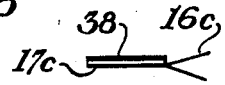
Figure 7:
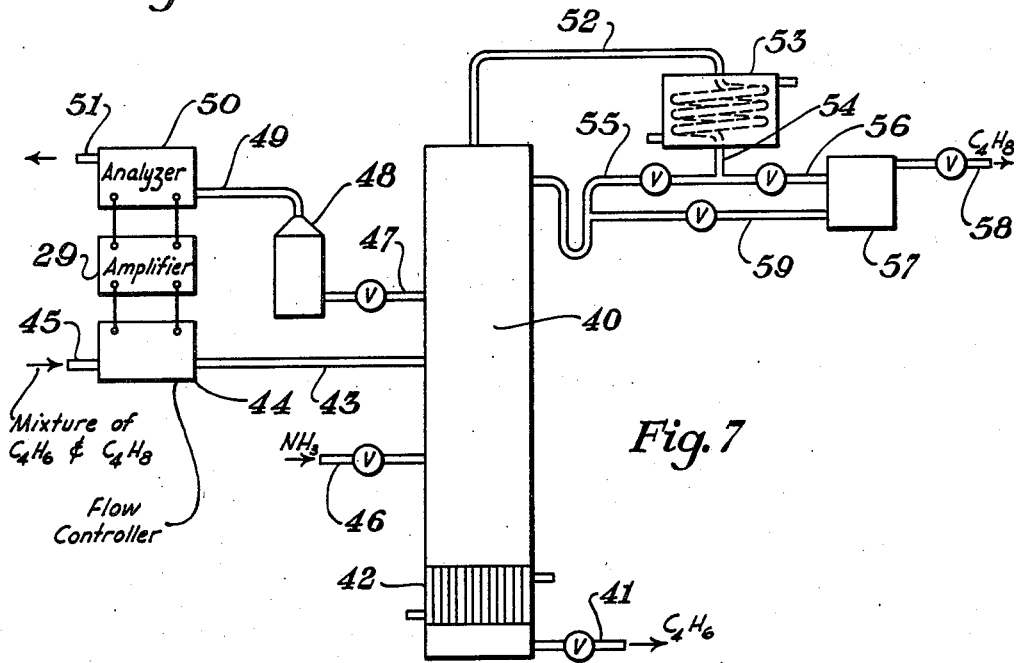

The accompanying drawings illustrate certain of the forms and arrangements of apparatus which may be employed in practicing the invention. Fig. 1 of the drawings shows a view, partly in cross section, of the analyzer provided by the invention, which analyzer includes the detector cell 4, and it also shows, in diagrammatic manner, a variable electric circuit for connecting the analyzer with a usual amplifier and connections of the latter with a continuous recorder. Fig. 2 is a top cross-sectional view of the lower half of the detector cell 4. Fig. 3 is a perspective view, partly in cross section, of a detector cell of different construction from that shown in Figs. 1 and 2. Figs. 4 and 5 are side views of the thermocouples 16b and 16c that are provided with the metal fins 17b and 17c, respectively, which fins are coated with the respective layers 37 and 38 of light-absorptive substances. The thermocouples and coated fins of Figs. 4 and 5 constitute members of the detector cell 4B shown in Fig. 3. Fig. 6 is a top view, partly in cross section of the lower half of the detector cell 4B of Fig. 3. Fig. 7 is a diagrammatic sketch of a continuous distillation system including the continuous analyzer connected with a usual device for automatically controlling the rate of feed to the system. The continuous distillation system shown in Fig. 7 is adapted for the azeotropic distillation of a hydrocarbon mixture using ammonia as an entraining agent. It includes certain devices not required in carrying out other fractional distillations.

In Fig. 1 of the drawings, the numeral 1 designates an electric lamp for generating infrared light. The numeral 2 designates an instrument case, through a wall of which extends a tube 3 for admitting light to detector cell 4, inside of the case. The tube 3 which may be of metal, a plastic, or other suitable material, may be an open tube, as indicated, or it may be closed at the ends with windows which are transparent to infrared light. The cell 4, a top cross-sectional view of which is shown in Fig. 2, is divided into the chambers 5 and 5a which are separated by a wall 6. Chamber 5 is closed at the top by a window 7, which may be of lithium fluoride, rock salt, or other substance transparent to infrared light. Upon the window 7 is an opaque disk 8 having an aperture 9. The valved pipes 10 and 11 which extend through the walls of case 2 and chamber 5 serve as an inlet and outlet for a fluid, preferably a gas or vapor, to and from the chamber. Chamber 5a is similarly provided at one side with inlet and outlet pipes, 10a and 11a, and at its top with a window 7a and an opaque disk 8a having an aperture 9a. The windows 7 and 7a and the disks 8 and 8a are held in place by a ring-shaped cap 12. In the mid-section of chamber 5 is a ring or band 13 composed in part of metal segments 14, e. g. segments of copper, brass, or silver, etc., which are separated from one another and also from the walls of the chamber by an electric insulating material 15, such as mica, paper, or polystyrene, etc. Adjacent metal segments 14 of the ring or band 13 are joined by a thermocouple 16, the two wires of which are of course of different metals, e. g. one of said wires may be of bismuth and the other of silver. A number of other combinations of metals suitable for the construction of thermocouples are well known. At the junction of each thermocouple 16 is a thin metal fin 17, preferably having bright reflective surfaces, which fin serves to transmit heat rapidly to and from the thermocouple. The thermocouples 16 and their fins 17 are preferably protected, e. g. by the opaque disk 8, from direct exposure to light entering the chamber. Within chamber 5a the parts 13a, 14a, 16a and 17a correspond to the parts 13, 14, 16, and 17 just described. Inside of each of the chambers 5 and 5a there is, accordingly, a thermopile formed by the connection of the several thermocouples in series. One end of the thermopile in chamber 5 and the corresponding end of the thermopile in chamber 5a are connected to the terminal 18 which extends through the wall 6 separating the two chambers. The terminal 18 is electrically connected with another terminal 19 which extends through the outer wall of cell 4 and is electrically insulated from the latter. The other ends of the thermopiles in chamber 5 and 5a are connected with the respective terminals 20 and 20a which extend through the outer wall of cell 4 and are electrically insulated from the latter. The terminals 19, 20 and 20a are electrically connected with the respective terminals 21, 22 and 22a which extend through the wall of the instrument case 2. The thermopiles in chambers 5 and 5a are thus connected with their electric potentials in opposition.

Interposed between tube 3 and the detector cell 4 is a sample cell 23 which is provided at each end with a tightly fitting window 24 held in place by a ring shaped cap 25. The window 24 is, of course, constructed of a substance such as lithium fluoride or sodium chloride which will transmit infrared light. Pipes 26 and 27, which extend through the walls of case 2 and of sample cell 23, serve as an inlet and outlet for passage of a fluid, preferably a gas or vapor, through the cell. By constructing cell 23 so that it is very shallow, preferably of depth not exceeding one millimeter, it may be adapted for the passage therethrough of liquid mixtures which are to be analyzed.

The tube 3, detector cell 4 and the sample cell 23 within case 2 are surrounded by a heat insulating material 28, such as asbestos, or rock wool, etc.

The terminals 22 and 22a are connected with a usual device 29, such as the Weston Electric Instrument Corp. "Photoelectric potentiometer," for amplifying the current or voltage between the two thermopiles of the detector cell 4. A shunt line 30, which extends from the terminal 21 and includes a variable resistance 31, permits varying or balancing of the voltage or current supplied by the opposing thermopiles of detector cell 4 to the amplifier 29.

The electric circuit illustrated in Fig. 1 of the drawings includes, as a sub-circuit, a battery or other source of current 32, the fixed resistances 33 and 34, and a variable resistance 35 which may be adjusted to maintain a small but constant current from said source through the major circuit. The inclusion of such minor current-generating circuit within the major electric circuit is desirable, since it facilitates adjustment of a continuous recording device, when employed. However, the minor circuit is not essential and it may be omitted.

The amplifier 29 is connected in Fig. 1 of the drawings with a usual device 36, e. g. a Leeds and Northrup "Potentiometer recorder," for continuously recording the voltage or amperage applied to the same. As is well known such recording device may be calibrated to give direct readings in terms of the value being measured, i. e. in the present instance in terms of the composition of the mixture being analyzed.

As hereinbefore mentioned, it is essential that the chambers 5 and 5a of the detector cell 4 be charged with different substances (preferably in gaseous or vaporized form) which have the property of absorbing infrared light and that the substance in one of these chambers possess a strong light absorption band of wave length corresponding to the distinctive absorption band of one of the components of the mixture to be analyzed. The substance in the other chamber of the detector cell may possess a strong light absorption band corresponding to a distinctive absorption band of another component of the mixture to be analyzed, or its stronger absorption bands may not correspond to the stronger absorption bands (and possibly not to any of the absorption bands) of any of the components of the mixture to be analyzed.

The detector cell shown in Figs. 3, 4, 5, and 6 may be used in place of the detector cell 4 of Fig. 1. In Figs. 3, 4, 5, and 6, the numeral 4B designates a cup-shaped cell which is provided inside its lower end with a ring 13b made up of two series of metal segments 14b and 14c, respectively, and between these series of segments, the single metal segment 14d, which metal segments are separated from one another and from the walls of cell 4B by the electric insulating material 15. The metal segments 14b are connected in series by the thermocouples 16b to form a thermopile. The metal segments 14c are connected in series by thermocouples 16c to form another thermopile which is connected by the segment 14d with the first mentioned thermopile in such way that the electric potentials of the two thermopiles are in opposition, e. g. the positive ends of the two thermopiles may be electrically connected. A wire or other electric conductor 39 connects the metal segment 14d with a terminal 21b which extends through the wall of the cell 4B. The ends of the two thermopiles not connected to the segment 14d are connected to the respective terminals 22b and 22c, which also extend through the wall of the cell 4B. Each of the thermocouples 16b is provided at its juncture with a thin metal fin 17b having bright reflective surfaces, which fin is coated, at least on the surface exposed to light entering the cell, with a layer 37 of a solid or a substantially non-volatile viscous liquid substance capable of absorbing certain of the wave lengths of infrared light. Similarly each of the thermocouples 16c is provided at its juncture with a shiny metal fin 17c, which fin is coated, at least on the surface exposed to light entering the cell, with a layer 38 of a different solid or substantially non-volatile viscous liquid substance which is also capable of absorbing certain wave lengths of infrared light, but the stronger light absorption bands of which are different from those of the substance forming the layer 37. One of the layers 37 or 38 is of a substance having a strong light absorption band corresponding in wave length to a distinctive absorption band of one of the components of the mixture to be analyzed. The other of these layers may possess a strong light absorption band corresponding to that of another of the components of the mixture to be analyzed, or its stronger absorption bands may be such as not to correspond to those of any of the components of the mixture to be analyzed. Examples of substances of which the layers 37 and 38 may be composed are paraffin wax having a light absorption band of 3.42 mu, di-(orthoxenyl) monophenyl phosphate having an absorption band of 3.27 mu, and para-tetraphenyl having an absorption band of 3.27 mu. The upper end of cell 4B is closed by a window 7b which is held in place by a ring-shaped cap 12b. A valved tube 10b, which extends through the wall of the cell may be used to evacuate the latter. The bottom inner surface of cell 4B may be blackened so that it will absorb light striking the same and will conduct away from the thermocouples 16b and 16c the heat thereby generated, but this is not essential, e. g. said surface may, if desired, be rendered bright and shiny so that it will reflect light.

In Fig. 7 of the drawings, the numeral 40 designates a distilling column which is provided near its lower end with a valved outlet 41 and with a source of heat 42, which may be a calandria, as indicated, or be a heater of other usual form, e. g. a boiler, or an inlet for steam. Near its midsection, column 40 is connected by line 43 with a usual electrically operated flow controller 44 of the type which controls the flow of a fluid in accordance with the amperage or voltage of the electric current operating the same. A number of such electrically operated flow controllers are known. The flow controller 44 is provided with a fluid inlet 45. Near its mid-section column 40 is also provided with another fluid inlet 46. At a point above said inlets, a valved line 47 leads from the side of column 40 to the lower end of a scrubbing device 48 which is charged with sulphuric acid, phosphoric acid, or other non-volatile acidic substance. A line 49 leads from the upper end of scrubber 48 and connects with a continuous analyzer 50, such as that shown in detail in Fig. 1 of the drawings. The analyzer 50 is provided with a fluid outlet 51. Analyzer 50 is joined by electrical connections with a usual amplifier 29 for amplifying the voltage or current generated by the analyzer 50. The amplifier 29 is electrically connected with the flow controller 44, and supplies the energy required to operate the latter. At its upper end, column 40 is provided with a vapor line 52 which connects with a condenser 53. Line 54, leading from the condenser, branches into two valved lines 55 and 56. Line 55 is a reflux line and connects with column 40 near the upper end of the latter. Line 56 connects with a separator 57, which may be a continuous separator or a usual settling chamber as desired. The separator 57 is provided near its top with a valved outlet 58 and near its lower end with a valved line 59 which connects with the reflux line 55.

The apparatus shown in the drawings is that usually employed in practicing the invention on a commercial scale. It may, however, be modified without departing from the invention. For instance, the recorder, or, if desired, both the recorder and the amplifier, shown in Fig. 1, may be omitted and an ordinary galvanometer, which has been calibrated as hereinbefore described, may be used instead. Again, in place of the particular forms of thermopiles shown in Figs. 1-6, thermopiles constructed in other usual ways may be used. If desired, the thermopiles may be replaced by a bolometer and the galvanometer be omitted, in which case the electric current passed through the bolometer may be amplified and transmitted to the recorder 36 or to the flow controller 44. In carrying out a distillation with apparatus such as that shown in Fig. 7, both the continuous recorder 36 and the flow controller 44, or a combination of these two devices, may, of course, be employed. When only a continuous analysis of the distilling mixture is desired, the flow controller is omitted and the amplifier is instead connected with an ammeter or voltmeter. Other ways in which the apparatus of the drawings may be changed or modified will be apparent.

The separation of butylene and butadiene by fractionally distilling a mixture thereof in the presence of ammonia is described in the copending application of H. S. Nutting et al., Serial No.

287,218, filed July 29, 1939. In said application it is disclosed that a butylene and butadiene, which compounds boil at close to the same temperature and cannot satisfactorily be separated by an ordinary fractional distillation, form with ammonia minimum azeotropes which differ sufficiently in boiling points and in heats of vaporization to permit ready separation of the same by fractional distillation. The ammonia is preferably employed in the proportion required to distill together with the butylene, but it may be used in larger proportions, e. g. in amount sufficient to form azeotropes with both the hydrocarbons present, or in excess over this amount, if desired. The distillation may be carried out at atmospheric pressure or thereabout, but occurs most favorably at pressures between 100 and 440 pounds per square inch gauge. In the copending application, it is also disclosed that when carrying out such distillation in continuous manner, the still residue, comprising the butadiene, may be withdrawn continuously from the lower end of a distilling column and the distillate, consisting largely of butylene and ammonia, may be caused to separate into a butylene layer and an ammonia layer, e. g. by cooling, and the ammonia layer may be returned continuously to the distillation. By operating in this manner, the ammonia is recycled in the distilling system and the introduction of ammonia from an outside source may be discontinued when sufficient ammonia has been introduced to continue the azeotropic distillation. The above-mentioned copending application discloses that other mixtures of low-boiling aliphatic hydrocarbons which normally distill together, but which are of different degrees of saturation, e. g. a mixture of amylene and pentadiene, or a mixture of hexylene and hexadiene, etc., may similarly be separated into its components by fractional distillation together with ammonia.

In separating such hydrocarbon mixture, e. g. a mixture of butylene and butadiene, by fractional distillation in the presence of ammonia, it is important that the distillation be controlled carefully, since the azeotropes to be separated differ only slightly in boiling point, e. g. usually by less than 3° C. The present invention provides a method and apparatus whereby the degree of fractionation obtained may be observed and recorded continuously and whereby the distillation may be controlled automatically to maintain highly efficient fractionation of the mixture. Fig. 7 of the drawings indicates the kinds and arrangement of apparatus to be employed in order to accomplish these ends.

In applying the present invention for the continuous analysis of the distilling mixture and for automatic control of the distillation during such fractional distillation of a mixture of butylene and butadiene together with ammonia in the apparatus illustrated in Fig. 7, a small portion of the distilling mixture is withdrawn continuously from column 40 through line 47 and is passed in vaporized form into the scrubber 48 where it is scrubbed with sulphuric acid, phosphoric acid, or other non-volatile acidic substance to remove the ammonia therefrom. The remaining vapor mixture of butylene and butadiene flows to the analyzer 50 which is preferably of the construction shown in detail in Fig. 1 of the drawings.

Referring now to Fig. 1, the vapors flow through the sample cell 23 where they are exposed to infrared light from source 1. The vapors flow from cell 23 through outlet 27 which corresponds to outlet 51 of Fig. 7. Light transmitted through the vapors in cell 23 enters the chambers 5 and 5a of detector cell 4. One of these chambers, e. g. chamber 5, is filled with butylene or another substance such as butane, pentane, hexane, or other organic compound containing methyl and/or methylene radicals. All such compounds have a strong light absorption band of approximately the same wave length as that of butylene. The other chamber, e. g. chamber 5a, of cell 4 is advantageously filled with vapors of butadiene or other substance, e. g. benzene or cyclopentadiene, etc., having a strong light absorption band corresponding to that of butadiene. However, if desired, one of the chambers 5 or 5a of cell 4 may be charged with vapors having a strong absorption band corresponding to that of butylene, or to that of butadiene, and the other chamber may be charged with vapors, the stronger light absorption bands of which do not correspond to those of either butylene, or butadiene, or any other component of the hydrocarbon mixture in the sample cell 23.

The electric current or voltage generated by the thermopiles in chambers 5 and 5a of cell 4, which thermopiles are connected in opposition to one another through the amplifier 29, is transmitted in amplified form either to the recorder 36 of Fig. 1 (which is in essence an ammeter or voltmeter designed so as to continuously record the amperage or voltage applied to the same), or to the flow controller 44 of Fig. 7, which is thereby actuated so as to regulate automatically the flow of the hydrocarbon mixture to the distilling column 40. Prior to use in the process, the recorder, when employed, is of course calibrated as hereinbefore described so as to give readings indicating the proportion of butylenes, or of butadiene, in the mixture being analyzed. When the portion of the distilling mixture to be analyzed is withdrawn from a point near the top of the column 40, as shown in Fig. 7, the flow controller 44 is adjusted so that a decrease in the proportion of butylene in the mixture being analyzed will cause a reduction in the rate of hydrocarbon feed to column 40 and will thus cause an increase in the degree of fractionation obtained. When the mixture to be analyzed is withdrawn from column 40 at a point near the lower end of the latter, the flow controller is adjusted so that an increase in the butylene content (or a decrease in the butadiene content) of the mixture being analyzed will cause a reduction in the rate of feed of hydrocarbons to column 40. In practice, the material for analysis is advantageously withdrawn from a section of the distilling column where the composition of the distilling mixture varies most sharply from one distilling plate to the next.

During the distillation, the flow to column 40 of a butylene-butadiene mixture of constant composition is controlled by the flow controller 44 so that it tends to fluctuate about a point of balance. The flow controller is preferably adjusted so that the rate of flow corresponding to this point of balance is that which results in a distillate containing butylene in a form substantially free of butadiene and a residue containing butadiene in a form substantially free of butylene. If, during operation, the proportions of butylene and butadiene in the hydrocarbon feed to column 40 varies, the flow controller 44 is automatically regulated by the continuous analyzer 50 in such way as to change the rate of hydrocarbon feed to that necessary for efficient fractionation of the mixture.

The continuous analyzer and control apparatus herein disclosed may be applied in analyzing other organic mixtures while in motion and in automatically controlling systems for handling such other mixtures. For instance, the invention may be applied in continuously analyzing solid mixtures, e. g. a film of a mixture of polystyrene and of polymerized butadiene, and in automatically proportioning and blending the ingredients to form the desired mixture thereof. Examples of other organic mixtures which may be analyzed in accordance with the invention are liquid or gaseous mixtures of an aliphatic hydrocarbon, e. g. ethane, ethylene, propane, propylene, or butylene, and a halohydrocarbon, e. g. ethyl chloride, ethylene chloride, chloroform, or propylene chloride; mixtures of hydrocarbons of widely differing degrees of saturation such as a mixture of styrene and ethylbenzene or a mixture of ethylene and ethane; mixtures of an alcohol, such as methyl or ethyl alcohol, and an ester such as methyl formate or ethyl acetate; etc.

Other modes and means of applying the principle of the invention may be employed instead of those explained, change being made as regards the method or apparatus herein disclosed, provided the steps or means stated by any of the following claims or the equivalent of such stated steps or means be employed.

I therefore particularly point out and distinctly claim as my invention:

1. A method for analyzing a mixture comprising a heteratomic compound to determine the proportion of the latter in the mixture which comprises exposing the mixture to infrared light, directing the light transmitted through the mixture onto two different and separate substances capable of absorbing infrared light at room temperature to form light absorption spectra, a strong light absorption band of one of said substances being of a wave length corresponding to that of said heteratomic compound and being different from the stronger light absorption bands of the other of said substances, and each of said substances being in contact with means for varying an electrical characteristic uniformly with change in the temperature of the substance, each of the two means for varying an electric characteristic being shielded against direct exposure to the light which is directed onto the light-absorptive substance in contact therewith and the two means being connected with their electric potentials in opposition and with an electric measuring device in the circuit, whereby the difference in electric energy from said opposing means is varied in accordance with the proportion of said heteratomic compound in the mixture and the resultant change in the electric energy between the cells is indicated.

2. A method for continuously analyzing while in motion a mixture containing at least two organic compounds, one of which has a strong light absorption band distinct from those of the other components of the mixture, which comprises passing the mixture through a zone wherein it is exposed to infrared light, directing the light transmitted through the mixture onto two different and separate substances capable of absorbing infrared light at room temperature to form light absorption spectra, a strong light absorption band of one of said substances being of a wave length corresponding to the distinctive light absorption band of one of the organic components of said mixture and being different from the stronger light absorption bands of the other of said substances, and each of said substances being in contact with means for varying an electric potential uniformly with change in the temperature of the substance, each of the two means for varying an electric potential being shielded against direct exposure to the light which is directed onto the light-absorptive substance in contact therewith and the two means being connected with their electric potentials in opposition and with an electric measuring device in the circuit, whereby the difference in electric potential from said opposing means is varied in accordance with the proportion in said mixture of the organic compound having the distinctive light absorption band and is continuously indicated by the electric measuring device.

3. A method for continuously analyzing while in motion a mixture containing at least two organic compounds, one of which has a strong light absorption band distinct from those of the other components of the mixture, which comprises passing the mixture through a zone wherein it is exposed to infrared light, directing the light transmitted through the mixture onto two different and separate substances capable of absorbing infrared light at room temperature to form light absorption spectra, a strong light absorption band of one of said substances being of a wave length corresponding to the distinctive light absorption band of one of the organic components of said mixture and being different from the stronger light absorption bands of the other of said substances, and each of said substances being in contact with a thermopile, the two thermopiles being shielded against direct exposure to the light which is directed onto the light-absorptive substances in contact therewith and being connected with their electric potentials in opposition and with an electric measuring device in the circuit, whereby the difference between the electric potentials of the thermopiles is varied in accordance with the proportion in said mixture of the compound having the distinctive light absorption band and is continuously indicated by the electric measuring device.

4. A method as described in claim 2 wherein the substance in contact with one of the means for varying an electric potential possesses a strong light absorption band of wave length corresponding to the distinctive light absorption band of one of the organic components of the mixture being analyzed and the substance in contact with the other of the means for varying an electric potential possesses a strong light absorption band corresponding in wave length to a distinctive light absorption band of another of the organic components of the mixture being analyzed.

5. A method as described in claim 2 wherein the mixture to be analyzed comprises an olefine and a diolefine.

6. A method as described in claim 2 wherein the mixture to be analyzed consists largely of butadiene-1.3 and at least one of the butylenes, the substance in contact with one of the means for varying an electric potential possesses a strong light absorption band of wave length corresponding to a light absorption band of butadiene, the substance in contact with the other of the means for varying an electric potential possesses a strong light absorption band of wave length corresponding to a distinctive light absorption band of butylene, and the electric measuring device is a continuous recorder which is calibrated to indicate the proportion of one of the compounds, butylene and butadiene, in said mixture.

7. A method as described in claim 3 wherein the substance in contact with one of the thermopiles possesses a strong light absorption band of wave length corresponding to the distinctive light absorption band of one of the components of the mixture being analyzed and the substance in contact with the other thermopile possesses a strong light absorption band corresponding in wave length to the distinctive light absorption band of another of the organic components of the mixture being analyzed.

8. A method as described in claim 3 wherein the mixture to be analyzed comprises an olefine and a diolefine.

9. A method as described in claim 3 wherein the mixture to be analyzed consists largely of butadiene-1.3 and at least one of the butylenes, the substance in contact with one of the thermopiles possesses a strong light absorption band of wave length corresponding to a light absorption band of butadiene-1.3, the substance in contact with the other thermopile possesses a strong light absorption band corresponding in wave length to a distinctive light absorption band of butylene, and the electric measuring device is a continuous recorder which is calibrated to indicate the proportion of one of the compounds, butadiene and butylene, in said mixture.

10. An apparatus for determining the proportion in an organic mixture of a component thereof having a light absorption band distinct in wave length from those of the other components which comprise a source of infrared light, two detector chambers positioned to receive light from said source, one of which chambers contains a substance having a strong light absorption band of wave length corresponding to the distinctive light absorption band of one of the components of the mixture and in contact with said substance a means for uniformly varying an electric potential in accordance with the temperature of said substance, and the other of which chambers contains a substance, the stronger light absorption bands of which are different from those of the first of said substances, and in contact therewith a means for varying electric potential in accordance with the temperature of the substance, said two means being shielded against direct exposure to the light which is directed onto the light-absorptive substances in contact therewith and being connected with their electric potentials in opposition and with an electric measuring device in the circuit, and, interposed between said source of light and said two detector chambers, means for exposing the organic mixture to the infrared light.

11. An apparatus as described in claim 10 wherein the means for exposing the mixture to light is a chamber having an inlet and outlet for passage of a fluid therethrough and having windows for transmitting light through the chamber.

12. In a method wherein a hydrocarbon mixture comprising an olefine and a diolefine is fractionally distilled in continuous manner and the fractional distillation is automatically controlled to maintain predetermined substantially constant conditions by control means which are electrically actuated in accordance with the departures of a variable condition of the system from a predetermined value, the steps of electrically actuating an electric circuit of the control means by passing a fraction of the distillation mixture, which fraction is at all times withdrawn from the same point in the distillation system, through a zone where it is exposed to infrared light, directing the light transmitted through the mixture onto different and separate substances capable of absorbing infrared light at room temperature to form light absorption spectra, a strong light absorption band of one of said substances being of wave length corresponding to a distinctive light absorption band of a component selected from the class consisting of the olefine and the diolefine and being different from the stronger light absorption bands of the other of said substances, and varying an electrical characteristic in the electric circuit of the control means in accordance with the resultant changes in the temperatures of said substances by contacting the latter, respectively, with electrically opposed thermally responsive members of the electric circuit to maintain said substantially constant conditions.

13. In a method wherein a hydrocarbon mixture consisting largely of butadiene-1.3 and at least one of the butylenes is fractionally distilled in continuous manner and the rate of flow of the mixture to the distillation is automatically controlled, to obtain efficient fractionation, by control means which are electrically actuated in accordance with the departures of a variable condition of the system from a predetermined value, the steps of electrically actuating the control means by passing at least a portion of the mixture which is undergoing distillation through a zone where it is exposed to infrared light, directing the light transmitted through the mixture onto different and separate substances capable of absorbing infrared light at room temperature to form light absorption spectra, a strong light absorption band of one of said substances being of wave length corresponding to a distinctive light absorption band of one of the principal components of the mixture and being different from the stronger light absorption bands of the other of said substances, and varying an electrical characteristic in the electric circuit of the control means in accordance with the resultant changes in the temperatures of said substances by contacting the latter, respectively, with electrically opposed thermally responsive members of the electric circuit.

14. In a method for handling an organic mixture, containing at least one component having a light absorption band distinctive from those of the other components, in a variable system permitting changes in the proportion, in the mixture, of the component possessing the distinctive light-absorption band with electrically actuated automatic control of the system in response to a change in the proportion of said component so as to cause a corresponding change in another variable condition of the system with resultant restoration of the proportion of said component to a predetermined value, the steps of passing at least a portion of the mixture in continuous flow from a given point in the system through a zone wherein it is exposed to infrared light, directing the light transmitted through the mixture onto two different and separate substances capable of absorbing infrared light at room temperature to form light-absorption spectra, a strong light-absorption band of one of said substances being of a wave length corresponding to the distinctive light-absorption band of one of the organic components of said mixture and being different from the stronger light-absorption bands of the other of said substances, and each of said substances being in contact with means for varying an electrical characteristic uniformly with change in the temperature of the substance, each of the two means for varying an electrical characteristic being shielded against full and direct exposure to the light which is directed onto the light-absorptive substance in contact therewith and the two means being connected with their electric potentials in opposition, so that the difference in electric energy of the opposing means is varied in accordance with changes, in the mixture being handled, of the proportion of the component possessing the distinctive light-absorption band, the difference in electric energy thus produced by the connected means for varying an electrical characteristic being adapted for actuation of means for automatically controlling the system to restore the proportion of said component possessing the distinctive light-absorption band to a predetermined value.

NORMAN WRIGHT.